United States Patent
Svrcek et al.

(10) Patent No.: US 11,873,906 B2
(45) Date of Patent: Jan. 16, 2024

(54) SPRINGS FOR PISTON RING BIASING

(71) Applicant: Mainspring Energy, Inc., Menlo Park, CA (US)

(72) Inventors: Matthew Svrcek, Redwood City, CA (US); Carlos Prieto, Mountain View, CA (US); Rucha Bedarkar, Mountain View, CA (US); Kevin Ting, Palo Alto, CA (US)

(73) Assignee: MAINSPRING ENERGY, INC., Menlo Park, CA (US)

( * ) Notice: Subject to any disclaimer, the term of this patent is extended or adjusted under 35 U.S.C. 154(b) by 52 days.

(21) Appl. No.: 17/528,723

(22) Filed: Nov. 17, 2021

(65) Prior Publication Data

US 2022/0154824 A1 May 19, 2022

Related U.S. Application Data (60) Provisional application No. 63/115,248, filed on Nov. 18, 2020.

(51) Int. Cl.
*F16J 9/06* (2006.01)

(52) U.S. Cl.
CPC .................... *F16J 9/061* (2013.01)

(58) Field of Classification Search
CPC ........ F16J 9/00; F16J 9/06; F16J 9/061; F16J 9/062; F16J 9/063; F16J 9/064; F16J 9/065; F16J 9/066; F16J 9/069; F16J 9/12; F16J 9/14; F16J 9/145; F16J 9/16; F16J 9/18

USPC ........................................................ 277/479
See application file for complete search history.

(56) References Cited

U.S. PATENT DOCUMENTS

| | | | | |
|---|---|---|---|---|
| 2,802,709 | A * | 8/1957 | Heinze | F16J 9/00 277/483 |
| 9,856,821 | B1 | 1/2018 | Svrcek | |
| 10,927,953 | B2 | 2/2021 | Svrcek | |
| 10,975,966 | B2 | 4/2021 | Prudhomme | |
| 2011/0221206 | A1* | 9/2011 | Milinkovic | F01K 13/00 60/660 |
| 2018/0106215 | A1* | 4/2018 | Svrcek | F16J 9/08 |
| 2019/0049006 | A1* | 2/2019 | Prudhomme | B23P 15/08 |
| 2019/0049011 | A1* | 2/2019 | Svrcek | F16J 9/20 |
| 2020/0195093 | A1 | 6/2020 | Svrcek | |

* cited by examiner

*Primary Examiner* — Nathan Cumar
(74) *Attorney, Agent, or Firm* — HALEY GUILIANO LLP (57) ABSTRACT

Systems and methods are provided for a cantilever beam arrangement that preloads ring segments in a multi0segment piston ring arrangement. A piston assembly comprises a piston that comprises a land. A ring segment is arranged against the land. The ring segment comprises a radially inner surface, a radially outer surface for sealing against a bore, and a boss located on the radially inner surface. The piston assembly also includes a beam spring having a proximal end attached to the piston and a distal end in contact with the boss. The beam spring forces at least a portion of the ring segment radially outward by applying a force on the boss.

20 Claims, 10 Drawing Sheets

SPRINGS FOR PISTON RING BIASING

CROSS-REFERENCE TO RELATED APPLICATIONS

This application claims the benefit of U.S. Provisional Patent Application No. 63/115,248 filed Nov. 18, 2020, the disclosure of which is hereby incorporated by reference herein in its entirety.

The present disclosure is directed to radial preloading of a piston ring assembly against a cylinder, and more particularly, to a cantilever beam arrangement that preloads ring segments in a multi-segment piston ring arrangement.

SUMMARY

The present disclosure is directed to a piston assembly. The piston assembly comprises a piston comprising a land, a ring segment arranged against the land, and a beam spring having a proximal end attached to the piston and a distal end in contact with the boss. The ring segment comprises a radially inner surface, a radially outer surface for sealing against a bore, and a boss located on the radially inner surface. The beam spring forces at least a portion of the ring segment radially outward by applying a force on the boss.

In some embodiments, the ring segment is a first ring segment and the cantilever beam is a first beam spring and the boss is a first boss. Additionally, the piston assembly further comprises a second ring segment opposing the first ring segment, a second boss located on an inner radial surface of the second ring segment, and a second beam spring having a proximal end attached to the piston and a distal end in contact with the second boss. The second beam spring forces the second ring segment radially outward.

In some embodiments, the piston is an open-faced piston comprising a gas path to the radially inner surface from a face of the piston.

In some embodiments, the piston assembly further comprises at least one gap cover element for sealing against the ring segment and against the bore.

In some embodiments, the piston comprises a ring groove, wherein the land forms a surface of the ring groove, and wherein the ring segment is arranged in the ring groove.

In some embodiments, the ring groove comprises at least one recess for accommodating a mounting feature of the beam spring.

In some embodiments, the piston assembly further comprises a front land comprising one or more retaining caps.

In some embodiments, the proximal end of the beam spring is attached to the piston by the one or more retaining caps, wherein the one or more retaining caps retain the beam spring against the piston.

In some embodiments, the beam spring comprises a first mounting feature for affixing to the piston and the piston comprises a second mounting feature for engaging with the first mounting feature.

In some embodiments, a sealing ring assembly comprises at least one ring segment configured to seal against a bore of a cylinder and a piston as well as at least one spring element arranged radially inward of the at least one segment and configured to apply a force radially outward on the at the least one ring segment, wherein the at least one spring element is configured to extend 180 degrees or less azimuthally around the piston.

In some embodiments the at least one spring element comprises a mounting section that is configured to be affixed to a piston and a spring section having an undeflected state when unloaded, wherein the spring section is configured to achieve a deflected state (i.e., in bending deflection) during operation.

In some embodiments, the spring section extends azimuthally along at least one of about 30 degrees, 45 degrees, 60 degrees, 90 degrees, 120 degrees, 180 degrees, or 360 degrees.

In some embodiments, the at least one spring element comprises a plurality of spring elements, and wherein the plurality of spring elements overlap azimuthally.

In some embodiments, the at least one ring segment comprises N ring segments, wherein the at least one spring element comprises N spring elements, and wherein N is a positive integer greater than one.

In some embodiments, the at least one ring segment comprises a solid lubricating material, and wherein the sealing ring assembly is for operation without liquid lubricant or oil.

Additionally, described herein is a method of operating a linear generator. The method comprises controlling a trajectory of a translator comprising a piston, forming a seal between a bore of a cylinder and the piston using a sealing ring assembly for operating without oil or liquid lubricant, and applying a force radially outward on at the least one ring segment of the sealing ring assembly using at least one spring element arranged radially inward of the at least one segment, wherein the at least one spring element is configured to extend 180 degrees or less azimuthally around the piston.

In some embodiments, the method further comprises causing the sealing ring assembly to wear against the bore during operation.

In some embodiments of the method, applying a force radially outward on at the least one ring segment of the sealing ring assembly comprises maintaining the at least one spring element deflected during operation, and maintaining contact between the at least one spring element and the at least one ring segment.

In some embodiments, the method further comprises forming the seal between the bore of the cylinder and the piston forms a high pressure region and a low pressure region, and wherein a pressure difference between the high pressure region and the low pressure region changes with the trajectory of the first translator and the second translator.

In some embodiments, the method further comprises achieving a cycle comprising a compression process, an expansion process, and a breathing process that occurs between the expansion process and the compression process. Additionally, the method may comprise maintaining contact between the at least one spring element and the at least one ring segment during the breathing process.

BRIEF DESCRIPTION OF THE DRAWINGS

The present disclosure, in accordance with one or more various embodiments, is described in detail with reference to the following figures. The drawings are provided for purposes of illustration only and merely depict typical or example embodiments. These drawings are provided to facilitate an understanding of the concepts disclosed herein and shall not be considered limiting of the breadth, scope, or applicability of these concepts. It should be noted that for clarity and ease of illustration these drawings are not necessarily made to scale.

DETAILED DESCRIPTION

The present disclosure is applicable towards any suitable type of machine having a cylinder with a gas, a piston that reciprocates within the cylinder, and a piston ring that separates a high pressure in front of the ring from a lower pressure at the back of the ring. For purposes of brevity and clarity, the present disclosure will be described herein in the context of a free-piston linear generator. Specifically, a free-piston linear generator facilitating a chemical reaction in a reaction cylinder, configured for operating without oil or liquid lubricant. It will be understood, however, that the features disclosed herein can be implemented in the context of any other suitable device, including, for example, a compressor or pump. The embodiments in the present disclosure can be implemented in a crankshaft-based machine, which typically relies on oil to lubricate potential piston and cylinder and/or piston ring and cylinder contact points. However, the embodiments can be implemented in crankshaft-based machines in which no oil is used.

In some embodiments, a sealing ring assembly arranged on a piston may be forced radially outward to maintain contact with a bore to create a seal. This can be accomplished by using gas pressure from a high-pressure region in the cylinder acting on the inner radial surface of a sealing ring assembly to push the ring assembly radially outward into contact with the bore of the cylinder. As the piston travels away from the high-pressure region, that is away from top dead center (TDC), and toward bottom dead center (BDC), the pressure decreases, causing the radial force on the sealing ring assembly to decrease such that the sealing ring assembly may lose contact with the cylinder wall. This can create a leak path through which gasses can bypass the sealing ring assembly and flow behind the piston, or conversely, from the back of the piston to the front depending on the balance of pressures on each side of the piston at a given axial location along the stroke.

For example, open-faced pistons and seals are further described in commonly assigned U.S. patent application Ser. No. 15/294,438 titled "OPEN-FACED PISTON ASSEMBLY," filed on Oct. 14, 2016, which is hereby incorporated by reference herein in its entirety. In a further example, gap cover elements and sealing elements are further described in commonly assigned U.S. patent application Ser. No. 16/100,017 titled "PISTON SEALING ASSEMBLY HAVING A GAP COVER ELEMENT," filed on Aug. 9, 2018, which is hereby incorporated by reference herein in its entirety. For example, piston seals having solid lubricant are further described in commonly assigned U.S. patent application Ser. No. 16/100,124 titled "PISTON SEAL WITH SOLID LUBRICANT APPLICATOR," filed on Aug. 9, 2018, which is hereby incorporated by reference herein in its entirety. For example, linear generators are further described in commonly assigned U.S. patent application Ser. No. 16/719,916 titled "INTEGRATED LINEAR GENERATOR SYSTEM," filed on Dec. 18, 2019, which is hereby incorporated by reference herein in its entirety.

In an exemplary embodiment, at least one opening may be arranged around a piston face. The at least one opening or openings may be sized and arranged such that a minimum opening along a gas path between each opening and an inner surface of the piston ring assembly is at least a quench distance of the air and fuel mixture. For example, the openings can be sized between 1 mm and 10 mm or even greater (i.e., where the quench distance is less than 1 mm) In other examples, the openings can be sized less than 1 mm so long as the dimensions of the openings are still greater than the quench distance of the air and fuel mixture. It will be understood that the illustrated design is merely exemplary. Any other suitable design that provides openings for allowing a combustion reaction to propagate into the crevice volume defined between the inner surface of a piston ring and the bottom of a circumferential groove may be used in accordance with the principles of the present disclosure. The openings may comprise any suitable size and shape. They may be all substantially equivalent or, alternatively, one or more of the openings may be different in size, shape, or both relative to one or more of the remaining openings. In some embodiments, the at least one opening may cover a majority of the bottom of a circumferential groove around an external surface of the piston assembly below a front land.

Figure 1:
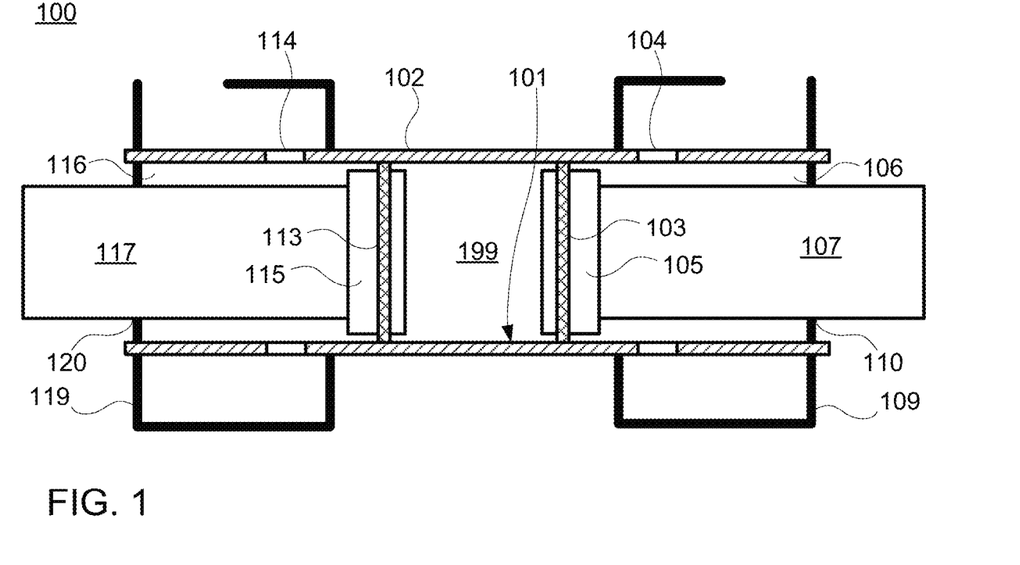
FIGS. 1 and 2 show schematic cross-sectional views of a free-piston linear generator having opposed pistons in two configurations, in accordance with some embodiments of the present disclosure.
Figure 2:
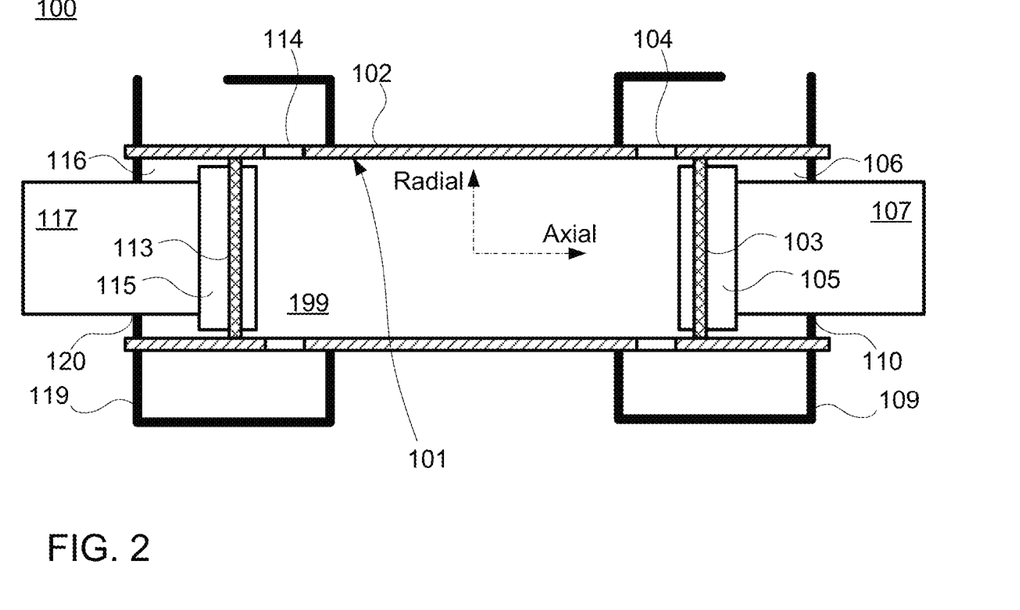

FIGS. 1 and 2 show schematic cross-sectional views of a free-piston linear generator having opposed pistons in two configurations in accordance with some embodiments of the present disclosure. FIG. 1 shows linear generator 100 at or near a top dead center (TDC) position, while FIG. 2 shows linear generator 100 at or near a bottom dead center (BDC) position. The radial and axial directions are indicated in FIG. 2 for purposes of illustration. In the illustrative linear generator, a pair of opposed pistons 105 and 115 reciprocate within cylinder 102, along bore 101 (e.g., the inner surface of cylinder 102). Sealing rings 103 and 113 arranged on each respective piston 105 and 115 define high-pressure region 199 between the two pistons 105 and 115. At each end of the reaction cylinder 102, there are ports 104 and 114 arranged in the wall of cylinder 102, extending into bore 101. Arranged between openings of each of ports 104 and 114 are port bridges that allow sealing rings 103 and 113 to traverse smoothly over ports 104 and 114. In some embodiments, implementing uniflow scavenging, linear generator 100 may include intake ports 104 on the intake side and exhaust ports 114 on the exhaust side, as illustrated in FIGS. 1 and 2. For example, when pistons 105 and 115 approach the ends of travel (e.g., a BDC position), ports 104 and 114 are in fluid communication with the gas volume of high pressure region 199 between pistons 105 and 115, as shown in FIG. 2. To illustrate, referencing FIG. 2, fresh reactants flow into cylinder 102 from the intake manifold 109 on one end, and reaction products from the previous cycle flow out from high pressure region 199 to exhaust manifold 119 on the opposite end.

As pistons 105 and 115 travel inward (e.g., axially towards a center of cylinder 102 or a TDC position), ports 104 and 114, and manifolds 109 and 119 become open to respective outboard regions 106 and 116 of cylinder 102, as shown in FIG. 1. To prevent reactants and products from leaking into the surroundings, seals 110 and 120 are arranged between respective translator tubes 107 and 117 (e.g., the shafts that hold respective pistons 105 and 115) and respective outboard regions 106 and 116. As pistons 105 and 115 move toward a TDC position, for example, pressure increases in high pressure region 199 of cylinder 102, which forces sealing rings 103 and 113 outward radially against bore 101 of the cylinder 102. This pressure in high pressure region 199 decreases as pistons 105 and 115 travel outward during the expansion stroke of the cycle (e.g., towards a BDC position). As pistons 105 and 115 move toward the outward end of the stroke (e.g., a BDC position), at some point, the gas pressure on the inward side of pistons 105 and 115 (i.e., the pressure in high pressure region 199) becomes low enough (e.g., relative to a pressure in regions 106 and 116, which may be referred to as low pressure regions) that it no longer forces sealing rings 103 and 113 radially outward. In some embodiments, the pressure in high pressure region 199 may be temporarily lower than the pressure on the outward side of the pistons 105 and 115 (i.e., outboard regions 106 and 116). In this situation, sealing rings 103 and 113 may experience a pressure drop that is reversed from the normal direction of sealing (e.g., the pressure in the low-pressure region may be greater than the pressure of the high-pressure region for a portion of the stroke).

The lack of radial force on one or more, or all, segments of sealing rings 103 and 113 could cause the seal components to shift out of position under some circumstances. For example, the segments of a multi-segment seal ring may be driven radially inward, collapsing until they contact a piston surface. This unintended contact itself may cause damage to the seal components, especially considering that the linear generator may run at high frequency and for many cycles. Additionally, during the compression stroke, when the pressure gradient results in a net outward radial force (e.g., the high-pressure region having a greater pressure than a low-pressure region), the out-of-position seal components must shift back into the desired position to create the seal against the cylinder wall. The increased relative motion increases the wear rate between seal components leading to a shorter life. In some cases, the seal components may not be able to shift fully back to the correct position and will either fail to create a seal or may break due to the repetitive impact and loading conditions. When the seal components fail to create a seal, there is leakage through the intended seal interface which reduces efficiency, alters emissions, and prevents ideal outputs. Additionally, if the segments of the seal components do not break, then continuous leakage can lead to thermal damage that ultimately causes mechanical failure of the seal components.

Keeping the seal components of sealing rings 103 and 113 in position means at least keeping them seated radially outward against the inner surface of the cylinder (i.e., bore 101 of cylinder 102) for a majority of the stroke. In some embodiments, uniform contact against the cylinder may not always be achievable. Springs may be incorporated into the assembly to reduce the separation from the cylinder. This may be accomplished by imposing a radially outward force on the seal components, where the force is not a function of the surrounding gas pressure (e.g., independent of the pressure of high-pressure region 199 or outboard regions 106 and 116 as the beam of the spring is pressure neutral when exposed to the trapped gas). In some embodiments, a mechanical spring is included to apply such a radial force on the ring segments. There are many types of mechanical spring candidates, such as coil compression and extension springs, spiral springs, disc or washer springs, and garter springs, which may be used for this seal application. However, these types of springs might not be designed or otherwise able to withstand the high axial acceleration that may be experienced in linear generators, which may be, for example, 300-G, 400-G, or even up to 500-G of axial acceleration (e.g., referenced to gravitational force "G"). If left unconstrained, a relatively thin wire of a coil or garter spring may fail relatively quickly from bending. If constrained in a groove or other housing to limit axial motion, some spring designs reciprocate under the reversing acceleration and fret or experience other similar contact damage against the housing walls. In addition, many spring designs are not intended to fit within the annular geometry of the seal and piston assembly, with the possible exception of a garter spring. Additionally, these types of springs might not be designed or able to withstand the high temperatures experienced in linear generators, which may be as high as 700° C. in some embodiments or from 500-1100° C. in some cases.

Figure 3:
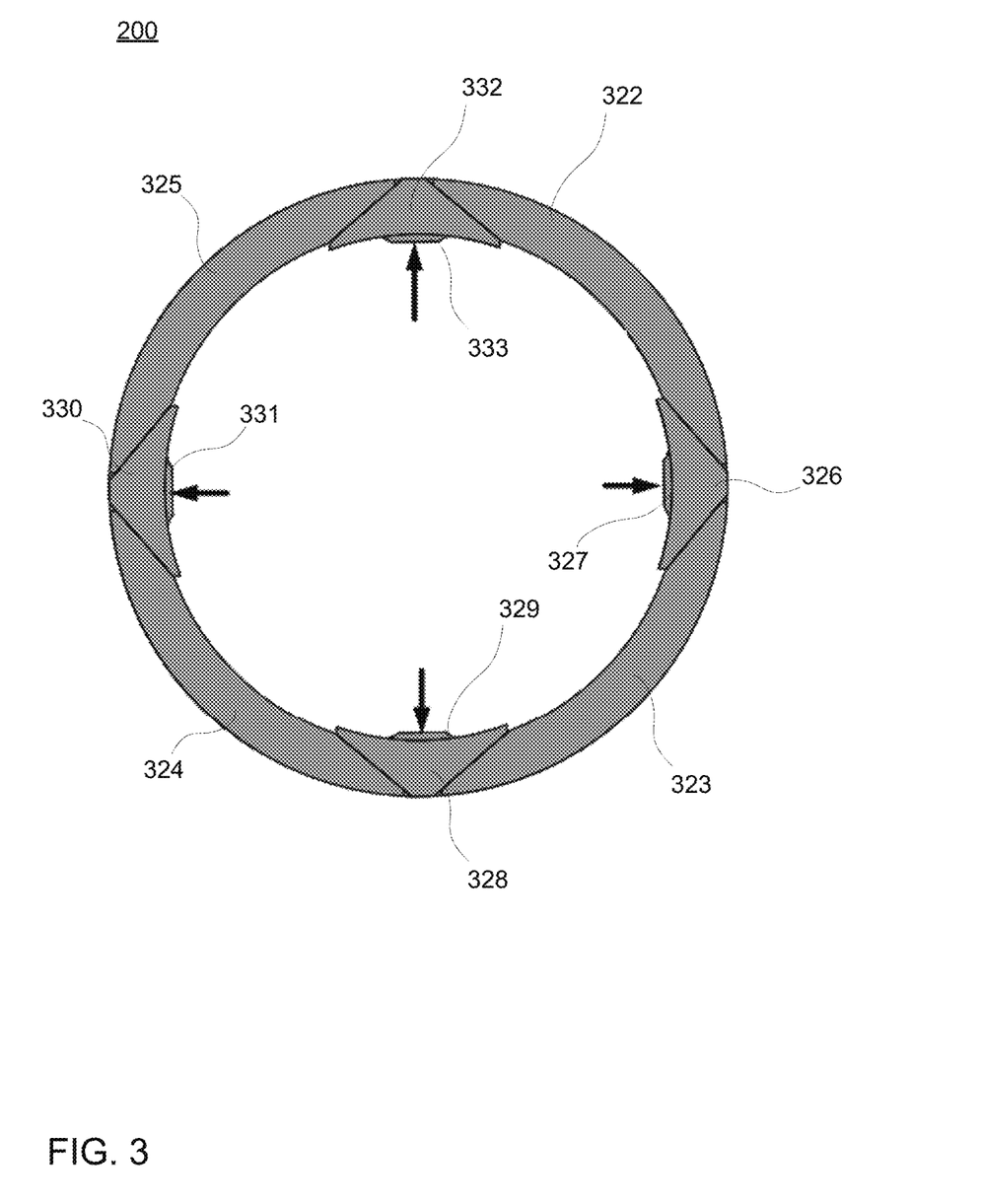
FIG. 3 shows a plan view of an illustrative multi-segment sealing ring assembly having radial forces that force the assembly outward, in accordance with some embodiments of the present disclosure.

FIG. 3 shows a multi-segment sealing ring assembly 200 having radial forces "F" that force the assembly outward, in accordance with some embodiments of the present disclosure. Sealing ring assembly 200 illustrates an example of sealing rings 103 and 113 of FIGS. 1-2, or a portion thereof. As illustrated, sealing ring assembly 200 includes four ring segments 322, 323, 324, and 325, each having a gap cover element 326, 328, 330, and 332 between adjacent ring segments. As illustrated, gap cover elements 326, 328, 330, and 332 interface with ring segments 322, 323, 324, and 325 via an angle or wedge, although any suitable interface may be included. When gap cover elements 326, 328, 330, and 332 are forced radially outward by gas pressure or spring force, they will stay in contact with ring segments 322, 323, 324, and 325 and force them radially outward. Each gap cover element 326, 328, 330, and 332 may include a respective boss 327, 329, 331, and 333 on the inner radial surface to interface with one or more springs as described herein. The boss allows the spring force to be localized to provide a discrete contact interface to provide a more predictable force transfer. The sealing rings disclosed herein may be made of any material suitable for sealing between a piston and a cylinder. In particular, materials suitable for oil-less operation may be used. Candidate materials include self-lubricating materials such as graphite, graphite-based, or graphite-like materials, as well as polymeric materials, metals, or composite materials (e.g., combinations of materials).

Figure 4:
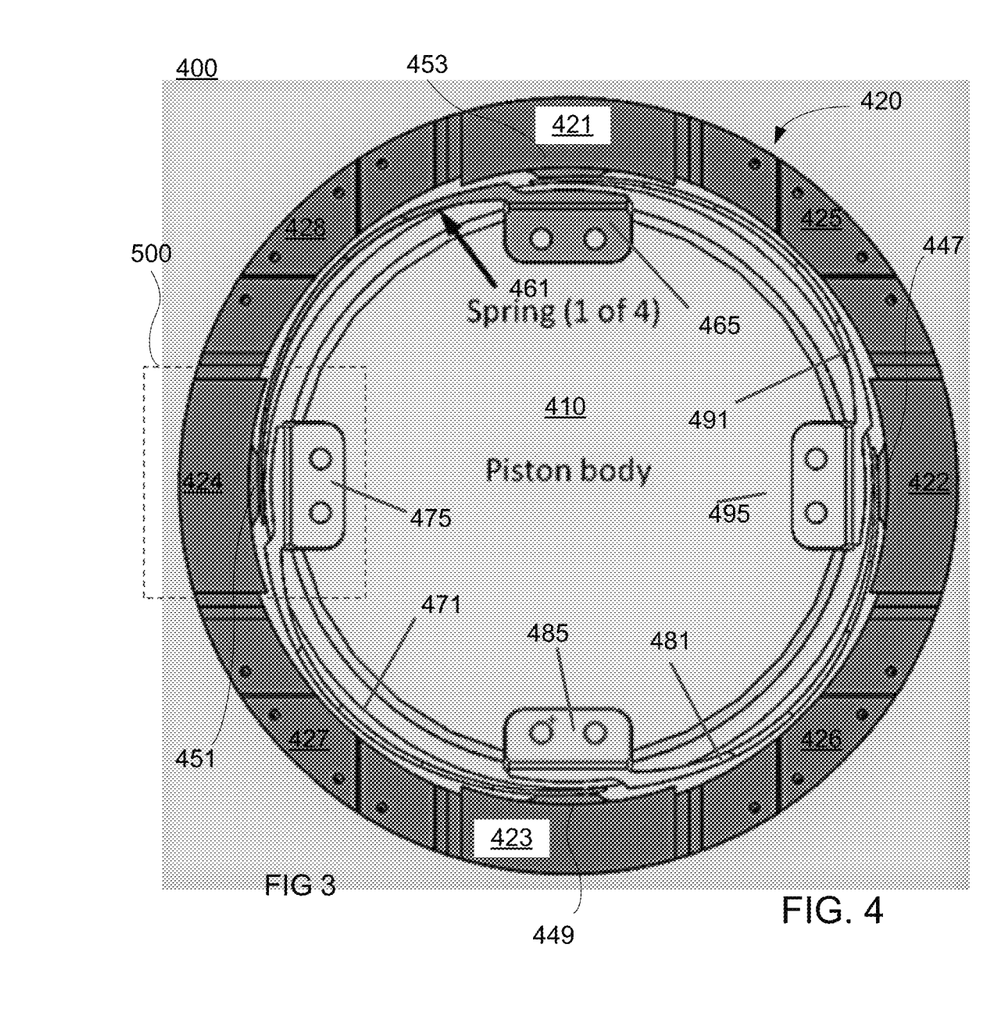
FIG. 4, shows a cross-sectional axial view of a portion of an illustrative piston assembly comprising a sealing ring assembly with four beam springs, in accordance with some embodiments of the present disclosure.
Figure 5:
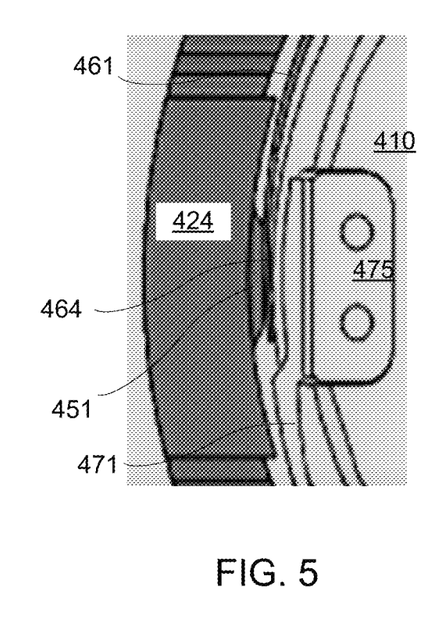
FIG. 5 is a detail view taken from FIG. 4 showing the overlap between two circumferentially adjacent beam springs, in accordance with some embodiments of the present disclosure.

FIG. 4, shows a cross-sectional axial view of a portion of illustrative piston assembly 400 including sealing ring assembly 420 with four beam springs 461, 471, 481, and 491, in accordance with some embodiments of the present disclosure. FIG. 5 is a detail view taken from FIG. 4 showing the overlap between two circumferentially adjacent beam springs 461 and 471, in accordance with some embodiments of the present disclosure. As illustrated, piston assembly 400 includes sealing ring assembly 420 (e.g., having ring segments 421-424 and 425-428) with four beam springs 461, 471, 481, and 491 arranged radially inward from the sealing ring assembly 420. Each of the beam springs 461, 471, 481, and 491 has a respective flange 465, 475, 485, and 495 for mounting to the piston 410. Flanges 465, 475, 485, and 495 mount rigidly to the piston 410 to provide the root constraint (e.g., with little or substantially no translation or rotation) so that each respective beam spring may behave as a cantilever beam. Beam springs 461, 471, 481, and 491 may be shaped such that the tip of each beam resides radially outboard from the base (e.g., the flange) of the next adjacent beam so that the beams may fit into the small packaging space between the piston 410 and the sealing ring assembly 420. For example, FIG. 5 is a detail view taken from FIG. 4 showing the overlap between two circumferentially adjacent beam springs 461 and 471. On the radially outboard side of beam spring 461, tip 464 presses against the boss 451 on the sealing ring assembly 420 (e.g., a rig segment thereof), while flange 475 of beam spring 471 is arranged radially inboard of the tip 464, having at least some clearance relative to the tip 464. The arrangement illustrated in FIGS. 4-5 allow for a longer beam length, which provides more range on a design variable to tune the force and stress distribution in the beams. Each of segments 421-428 of sealing ring assembly 420 may include graphite or other suitable ceramic, polymer, composite (e.g., graphite with metal reinforcement), any suitable solid lubricant, or any combination thereof. Beam springs 461, 471, 481, and 491 may include metal (e.g., steel, alloys, stainless steel, nickel allows) or other non-brittle material suitable for applying a spring force on at least some of segments 421-428.

In some embodiments, the tip 464 of beam 461 need not be attached to the sealing ring assembly 420 (e.g., any segments thereof), but abuts against the boss 451, leaving tip 464 kinematically unconstrained (e.g., other than by friction), to move radially inward and outward as well as axially forward and backwards. Therefore, the repetitive axial shock and vibration inherent in a piston cycle may cause relative movement, both radially and axially, between tip 464 and the boss 451, which may cause the boss 451 to wear (e.g., due to abrasion, galling, or fretting). Wear is accommodated by the boss 451 (e.g., which may include a solid lubricating material, ceramic material such as graphite, or a polymer), which is raised and can serve as a sacrificial element while still remaining raised enough through the lifecycle to provide an adequate contact interface with beam spring 461.

In some embodiments, tip 464 of beam spring 461 may be axially wider than boss 451 so that the axial edges of beam spring 461 overhang past the boss 451. To illustrate, this arrangement prevents the edges from scraping on boss 451 and may reduce wear while helping to avoid a situation where the spring 461, and particularly the spring tip (e.g., tip 464), may dig grooves into the boss (e.g., boss 451) such that the grooves constrain the axial motion of the tip 464. Furthermore, tip 464 of beam spring 461 may extend azimuthally beyond the boss 451 so that the tip 464 of beam spring 461 overhangs past the boss 451. This also prevents the tip 461 from catching on boss 451 especially as the ring segments move azimuthally due to wear. In some embodiments, the tip region may be axially, azimuthally, or tangentially wider to prevent the end of the spring from rubbing against the boss. As the ring segments move outwards due to wear causing an unwinding effect of the beam spring, a wider tip region prevents the edge towards the end of the tip spring from moving outwards.

Bosses 447, 449, 451, and 453 may be located on various inner radial aspects of a ring segment (e.g., any of segments 421-428), similar to bosses 327, 329, 331, and 333 of FIG. 3. For example, referencing FIG. 3, the bosses 327, 329, 331, and 333 extend from gap cover element 326, 328, 330, and 332, which tend to force adjacent segments radially outward when the fore (F in FIG. 3) is applied radially by the beam spring elements. Bosses 447, 449, 451, and 453 of FIGS. 4-5 are configured to behave similarly. The bosses of FIGS. 3-5 may have an initial height (e.g., radial extension from the corresponding ring segment) that is thick enough such that they remain effective even at the end of the life cycle of the sealing ring assembly after many cycles of contact and wear; that is, the bosses still serve to provide an effective interface to the beam springs, prevent wearing or damage into the sealing rings, and provide a contact location to preload the beam springs. For example, in a new sealing ring assembly (e.g., unworn), a boss may have a radial height of 5 mm while the beam spring is preloaded to 10 mm of deflection (e.g., see FIG. 9). Accordingly, even if the boss wears down to 1 mm (e.g., 1 mm extending out from the surface of the ring segment) after many cycles of use, the beam will still have a preload of 6 mm of deflection to bias the sealing ring assembly outward against the cylinder wall. Thus, the beam spring remains at least partially compressed and continues to apply the force radially outwards (e.g., although the magnitude of the force may change as the ring segments wear).

Figures 6, 7:
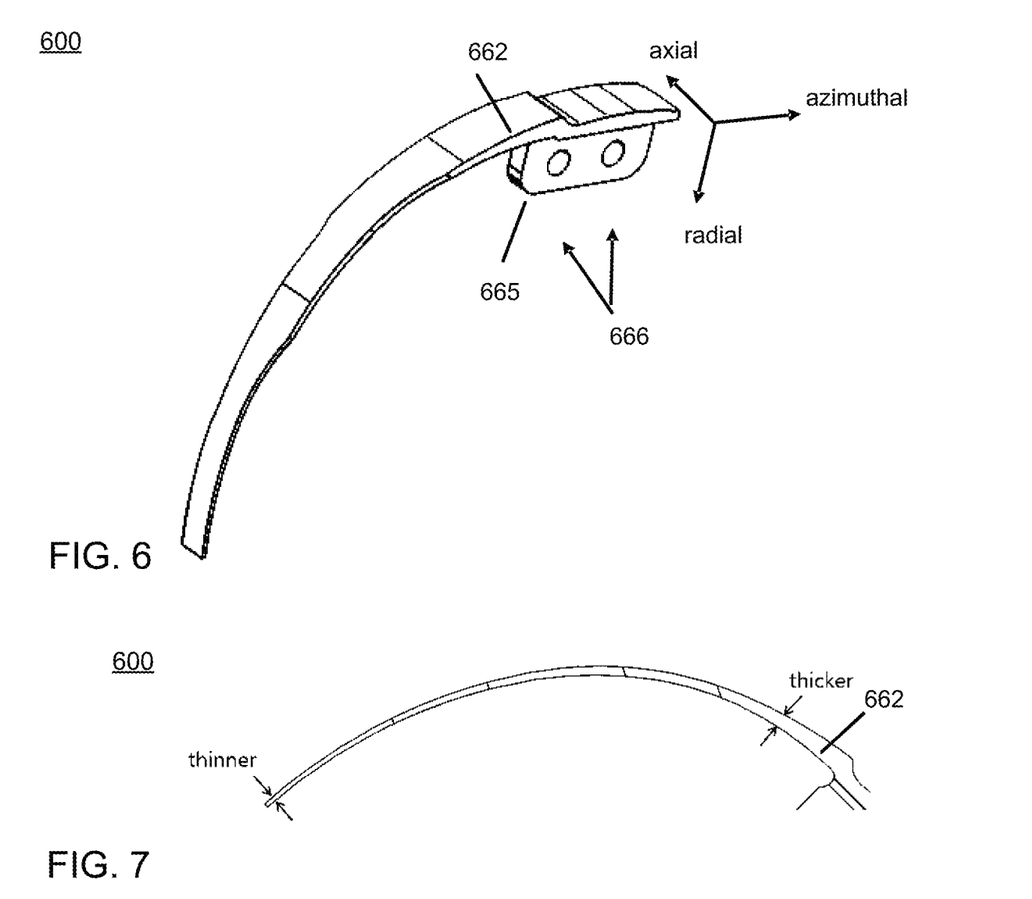
FIGS. 6-8 show a perspective view, axial view, and radial view of a beam spring, respectively, in accordance with some embodiments of the present disclosure.
Figure 8:
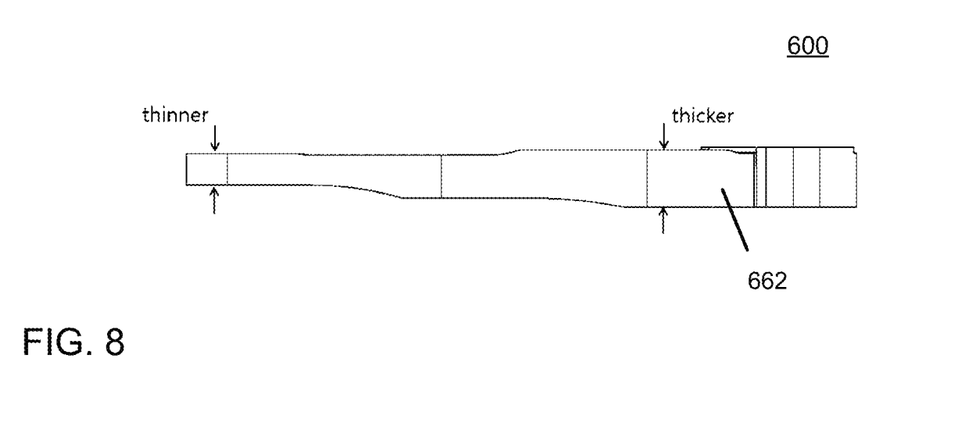

FIGS. 6-8 show a perspective view, axial view, and radial view of beam spring 600, respectively, in accordance with some embodiments of the present disclosure. Beam spring 600, as illustrated, includes a long azimuthal beam section that is thin in the radial direction and flange 665 at root 662 of the beam having holes 666 for mounting to a piston (e.g., piston 410 of FIGS. 4-5). The combination of long azimuthal length relative to thin radial thickness results in an acceptable stress distribution in the beam over the desired range of motion and applied forces. In some embodiments, the azimuthal length may be greater than fifty times the average radial thickness. In some embodiments, the azimuthal length may be twenty times the average radial thickness or up to two hundred times the average radial thickness in embodiments.

For example, for a piston with a diameter of about 195 mm, the length of each beam spring may be about 150 mm, for an arrangement with four beam springs. More generally, the length of a beam spring may be approximately one fourth (¼) of the circumference of a piston ring groove or slightly larger to account for clearance between the beam spring and the groove and any extra length at the root of the beam. For example, for a piston with a ring groove diameter of about 100 mm, the length of each beam spring may be about 82 mm, for an arrangement with four beam springs. The thickness of the beam spring may be about 1 mm on average in some embodiments; however, it may be thicker or thinner depending on the packaging space, stress distribution in the beam, material, desired stiffness, desire force, desired deflection, or a combination thereof. In some embodiments, the beam spring may have a thickness of 3 mm at the root of the beam and 0.8 mm at the tip.

The beam springs undergo high axial and radial accelerations that cause dynamic stresses due to inertial forces caused by mass distributed over the length of the beam. To reduce the inertial mass of the beam spring, the axial and radial dimensions may be tapered along the azimuthal length. The taper from root to tip of the beam (axially or radially) may be monotonic, that is, a continuous gradient, or it may be stepped, ramped, or a combination thereof as desired to tune the stress distribution in the beam and the desired force. The taper in thickness, in the direction of from the root to the tip, may be up to a 75% reduction in thickness. The axial transitions of the taper may be aligned such that the profile may be machined in a single setup (e.g., fewer setups than unaligned transitions of the taper). In other embodiments, the thickness of the tip may be reduced by 25% to 90% as compared to the thickness of the root. The overall shape of the beam spring in the axial view is a variable radius arc. In some embodiments, the beam spring may have a constant radius or any other shape that allows it to fit within the compact geometry of a piston assembly while providing a desired location of the tip to interface at the desired location on the sealing ring assembly. In some embodiments, the taper of the width from the root to the tip varies by a 50% reduction in width. In some embodiments, the thickness of the tip may be reduced by 25% to 75% of the thickness of the root.

In some embodiments, the axial thickness of the beam spring is larger than the radial thickness so that the beam spring may withstand the forces that result from the large axial accelerations of the piston assembly; that is, the beam spring may be designed so that the stresses are within material strength limits for high-cycle fatigue. In some embodiments, the axial thickness is greater than about 5 times the average radial thickness, while in some embodiments, the axial thickness may be between 2 times to 20 times the average radial thickness. In the example shown in FIG. 5C, the axial thickness varies from about 10 mm at the widest to about 5 mm at the narrowest, while the average radial thickness is about 1 mm. Candidate materials for the beam spring include ceramics, ceramic matrix composites (CMC), carbon fiber reinforced polymers, metals such as titanium, steel, nickel, or nickel superalloys such as Inconel. In some embodiments, the beam spring is fabricated by cutting a blank using wire EDM (electron discharge machining) in one or both planes (axial and radial), followed or preceded by additional conventional machining operations to create the flange and the holes.

Figure 9:
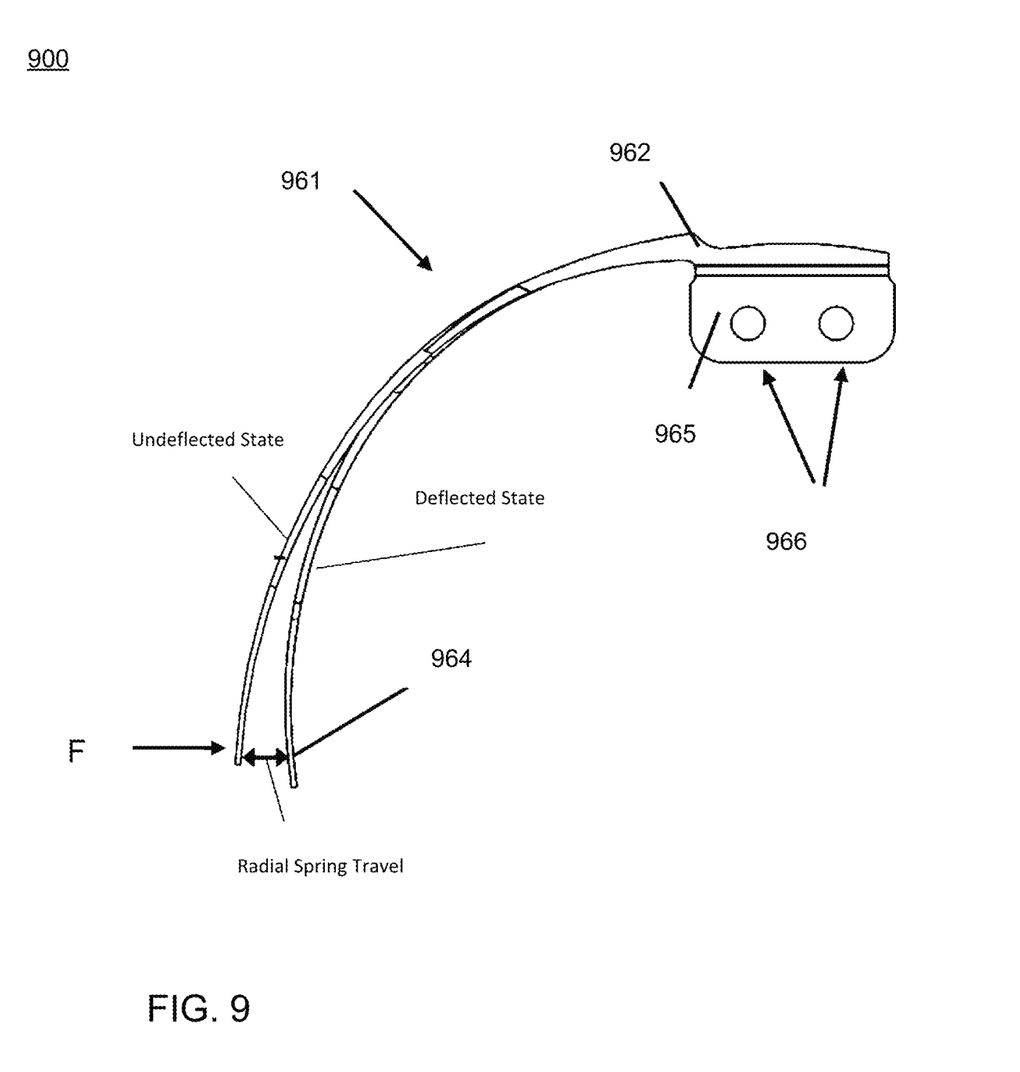
FIG. 9 shows a plan view of an illustrative beam spring in the undeformed state overlaid with the preloaded state as if it were engaged against a piston seal forcing the ring assembly radially outward, in accordance with some embodiments of the present disclosure.

FIG. 9 shows the beam spring 961 in the undeformed state overlaid with the preloaded state as if it were engaged against a piston seal forcing the ring assembly radially outward. The root 962 of the beam spring 961 may be constrained at the flange 965 by clamping the flange 965 with bolts or screws that pass through the mounting holes 966, thus forming a fixed boundary condition for the beam spring 961 as it deforms in bending. In some embodiments, when installed, the tip 964 of the beam spring 961 may displace approximately 10 mm radially when engaging with a new seal (no ring wear) to provide about 10 N of force to the boss. In some embodiments, the beam spring may provide between about 5 N and 25 N of force initially (no ring wear). In some embodiments, the beam spring may provide about 4 N, or between about 2 N and 8 N to the boss at the end of life (ring has worn). One skilled in the art would recognize that such a curvilinear beam may be designed to provide more or less radial force depending on design factors such as the size of the piston and cylinder, the amount of sealing ring pressure desired, and the amount of packaging space for the beam spring between the cylinder and the sealing ring assembly.

Figure 10:
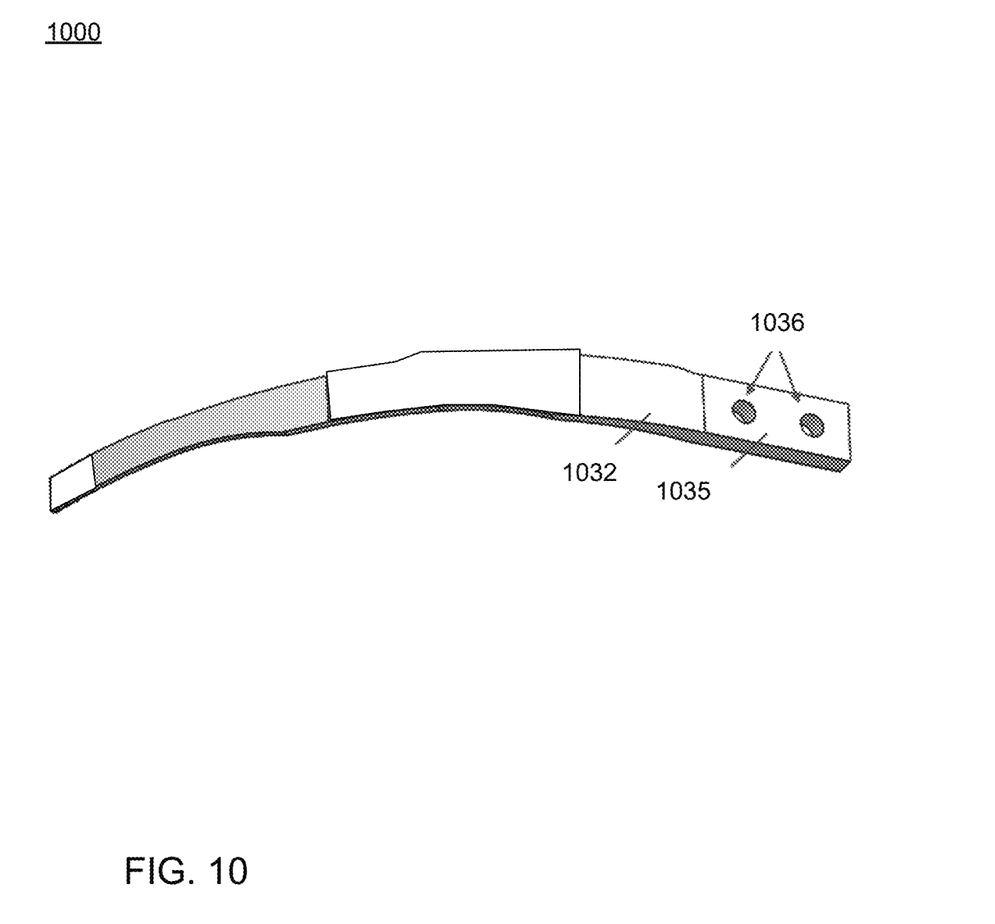
FIG. 10 shows an alternate piston attachment using screws, in accordance with some embodiments of the present disclosure.

FIG. 10 shows an alternate piston attachment using screws. Beam spring 1000, as illustrated, includes a long azimuthal beam section that is thin in the radial direction and flange 1035 at root 1032 of the beam having holes 1036 for mounting to a piston (e.g., piston 410 of FIGS. 4-5). The combination of long azimuthal length relative to thin radial thickness results in an acceptable stress distribution in the beam over the desired range of motion and applied forces. In some embodiments, the azimuthal length may be greater than fifty times the average radial thickness. In some embodiments, the azimuthal length may be twenty times the average radial thickness or up to two hundred times the average radial thickness in embodiments.

Figure 11:
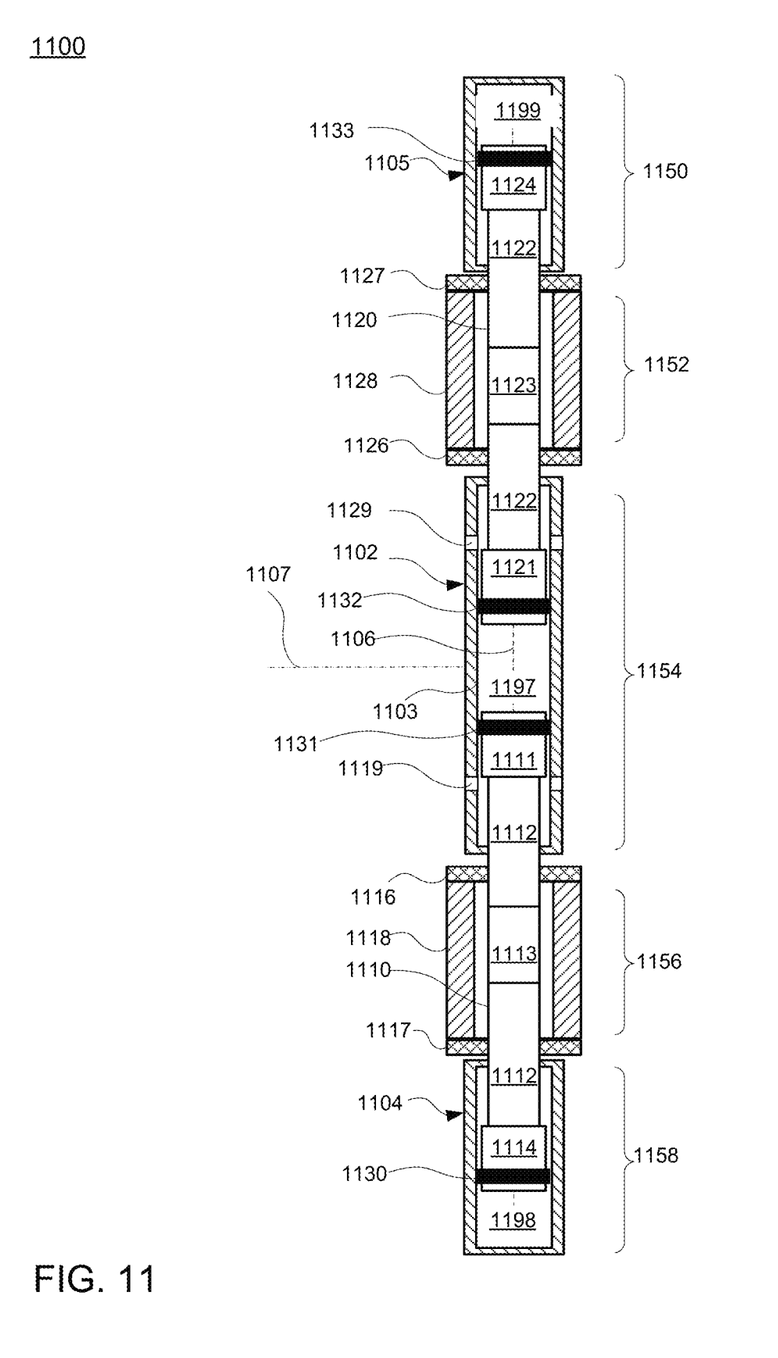
FIG. 11 shows a cross-sectional view of an illustrative generator assembly, in accordance with some embodiments of the present disclosure.

FIG. 11 shows a cross-sectional view of illustrative generator assembly 1100, in accordance with some embodiments of the present disclosure. Generator assembly 1100 is configured as an opposed, free-piston generator. As illustrated, generator assembly 1100 includes power cylinder 1154, LEMs 1152 and 1156, and driver sections 1150 and 1158. Generator assembly 1100 includes translators 1110 and 1120, which are configured to move along axis 1106 (e.g., translate linearly along axis 1106). Translators 1110 and 1120 are configured to move within cylinders 1102, 1104 and 1105, thus forming expansion and compression volumes 1197, 1198, and 1199 for performing boundary work (e.g., determined using the integral $\int PdV$ over a suitable range such as a stroke or cycle). For clarity, the spatial arrangement of the systems and assemblies described herein will generally be referred to in the context of cylindrical coordinates, having axial, radial, and azimuthal directions. It will be understood that any suitable coordinate system may be used (e.g., cylindrical coordinates may be mapped to any suitable coordinate system), in accordance with the present disclosure. Note that axis 1106 is directed in the axial direction, and the radial direction is defined as being perpendicular to axis 1106 (e.g., directed away from axis 1106). The azimuthal direction is defined as the angular direction around axis 1106 (e.g., orthogonal to both axis 1106 and the radial direction, and directed around axis 1106).

In some embodiments, the stationary components of generator assembly 1100 include cylinder 1102, cylinder 1104, cylinder 1105, stator 1118, stator 1128, bearing housing 1116, bearing housing 1117, bearing housing 1126, and bearing housing 1127. In some embodiments, bearing housings 1116 and 1117 are coupled to stator 1118 (e.g., either directly connected, or coupled by an intermediate component such as a flexure, mount, or both). For example, bearing housings 1116 and 1117 may be aligned to (e.g., laterally or axially aligned), and affixed to, stator 1118 to maintain a radial air gap between magnet assembly 1113 and stator 1118. Similarly, in some embodiments, bearing housings 1126 and 1127 are rigidly coupled to stator 1128. In a further example, in some embodiments, bearing housing 1126 and 1127 are aligned to stator 1118, but affixed to another portion of a generator assembly or components thereof.

Translator 1110 includes tube 1112, piston 1600 with sealing ring assembly 1131, piston 1114 with sealing ring assembly 1130, and magnet assembly 1113, all substantially rigidly coupled to move as a substantially rigid body along axis 1106, relative to the stationary components. Translator 1120 includes tube 1122, piston 1121 with sealing ring assembly 1132, piston 1124 with sealing ring assembly 1133, and magnet assembly 1123, all substantially rigidly coupled to move as a substantially rigid body along axis 1106. In some embodiments, magnet assemblies 1113 and 1123 may be a region of tubes 1112 and 1122, respectively. In some embodiments, magnet assemblies 1113 and 1123 may include separate components affixed to tubes 1112 and 1122, respectively. Reaction section 1197 is bounded by pistons 1111 and 1121, as well as bore 1103 of cylinder 1102. Gas springs 1198 and 1199 are bounded by respective pistons 1114 and 1124, as well as respective cylinders 1104 and 1105. Accordingly, as translators 1110 and 1120 move along axis 1106, the volumes of reaction section 1197, gas spring 1198, and gas spring 1199 expand and contract. Further, for example, pressures within those volumes decrease or increase as the volume increases or decreases, respectively. Each of bearing housings 1116, 1117, 1126, and 1127 is configured to provide a gas bearing between itself and the corresponding translator (e.g., tube 1112 and 1122). For example, each of bearing housings 1116, 1117, 1126, and 1127 may be configured to direct pressurized gas to the gas bearing (e.g., via a flow system). In an illustrative example, each of bearing housings 1116, 1117, 1126, and 1127 may be configured to direct pressurized gas having an absolute pressure greater than ambient pressure (e.g., 1 atm at sea level) to the gas bearing such that bearing gas has sufficient pressure to flow through the gas bearing and into the environment (e.g., directly or via other ducting). In some embodiments, bearing gas may be pressurized relative to the environment (e.g., about 1 atm), a pressure in a breathing system (e.g., a boost pressure, or a gas pressure in an exhaust system that may be greater than or less than 1 atm), or any other suitable pressure reference. In some embodiments, generator assembly 1100 is configured for oil-less operation (e.g., without the use of lubricating liquids or without the use of solid-to-solid contact bearings), with bearing housings 1116, 1117, 1126, and 1127 forming gas bearings against translators 1110 and 1120. Cylinder 1102 includes bore 1103, which houses compression section 1197. Cylinder 1102 also includes illustrative ports 1119 and ports 1129, which couple bore 1103 to the outside of cylinder 1102 to allow fluid exchange. In an illustrative example, any or all of sealing ring assemblies 1130-1133 may include any of the sealing ring assemblies of the present disclosure, and accordingly any of piston and sealing ring assembly combinations of generator assembly may include bosses, mounting features, beam springs, flanges, retaining caps, any other suitable features of the present disclosure, or any combination thereof. For example, sealing ring assemblies 1130-1133 may be configured for operation without liquid lubricant or oil, and may include graphite or other ceramic (e.g., a graphite material), a polymer, a metal reinforcement, a composite, any other suitable material, or any combination thereof.

Stator 1118, magnet assembly 1113, tube 1112, and bearing housings 1116 and 1117 form linear electromagnetic machine (LEM) 1156. Similarly, stator 1128, magnet assembly 1123, tube 1122, and bearing housings 1126 and 1128 form LEM 1152. Further, a LEM may optionally include one or more pistons affixed to the translator. For example, a LEM may be defined to include stator 1118, translator 1110, and bearing housings 1116 and 1117. In a further example, a LEM may be defined to include stator 1128, translator 1120, and bearing housings 1126 and 1127. A LEM includes a stationary assembly (e.g., a stator and bearing housings) and a translating assembly (e.g., a translator) that is constrained to move along an axis, wherein the stator is capable of applying an electromagnetic force on the translator to cause and/or effect motion along the axis. The bearing housings of a LEM may be, but need not be, affixed to the stator. For example, the bearings housings may be coupled to the stator, a structural frame, a cylinder, either directly or by one or more intervening components, or any combination thereof. Stators 1118 and 1128 may include a plurality of phase windings, which form a plurality of phases. The current in each of the phases may be controlled by a control system (e.g., which may include corresponding power electronics and processing equipment) to affect the position of translators 1110 and 1120, motion of translators 1110 and 1120, work interactions with translators 1110 and 1120, or any combination thereof. In some embodiments, magnet assemblies 1113 and 1123 include permanent magnets arranged in an array (e.g., of alternating North and South poles). Because translators 1110 and 1120 move as substantially rigid assemblies, electromagnetic forces applied to respective magnet assemblies 1113 and 1123 accelerate and decelerate translators 1110 and 1120. In some embodiments, stators 1118 and 1128 may be air-cooled (e.g., by an air-cooling system), liquid-cooled (e.g., by a liquid cooling system), or both. In some embodiments, stators 1118 and 1128 are arranged around respective translators 1110 and 1120, or respective magnet assemblies 1113 and 1123 thereof (e.g., the motor air gap is arcuate with a thickness profile). For example, stators 1118 and 1128 may extend fully around (e.g., 140 degrees azimuthally around) or partially around (e.g., having azimuthally arranged segments and azimuthally arranged gaps between windings of a phase) respective translators 1110 and 1120. In some embodiments, stators 1118 and 1128 are arranged axially along respective translators 1110 and 1120, or respective magnet assemblies 1113 and 1123 thereof. For example, magnet assemblies 1113 and 1123 may include flat magnet sections and stators 1118 and 1128 may include flat surfaces that correspond to the magnet sections (e.g., the motor air gap is planar with a thickness profile). In some embodiments, stators 1118 and 1128 extend axially along respective translators 1110 and 1120, or respective magnet assemblies 1113 and 1123 thereof.

Figure 12:
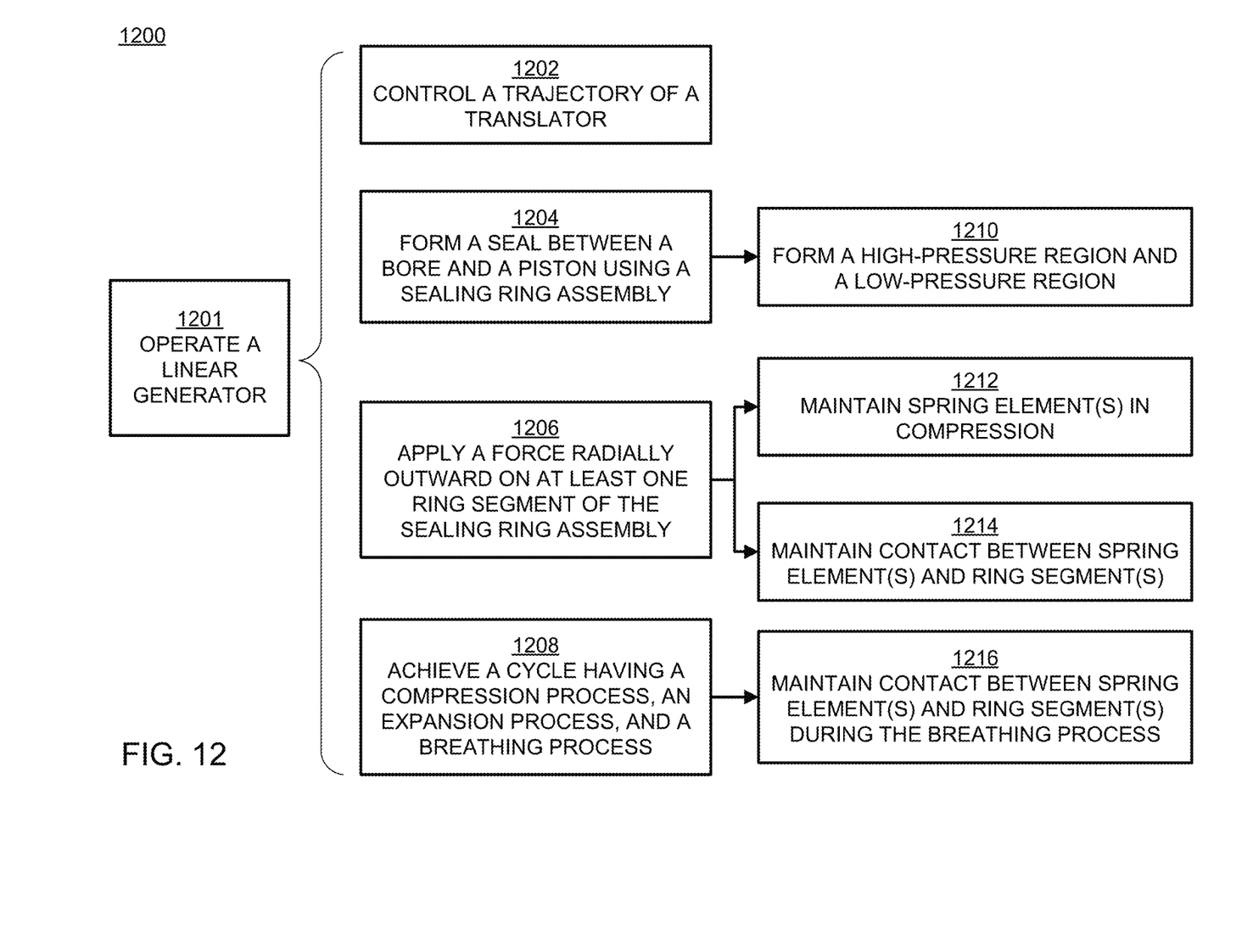
FIG. 12 is a flowchart of an illustrative process for operating a linear generator, in accordance with some embodiments of the present disclosure.

FIG. 12 is a flowchart of an illustrative process 1200 for operating a linear generator, in accordance with some embodiments of the present disclosure. At 1201, an instruction to initiate the operation of a linear generator is received. At 1202, the trajectory of a translator is controlled. At 1204, a seal between a bore and a piston using a sealing ring assembly is formed. At 1210, a high-pressure region and a low-pressure region are formed on either side of the seal. At 1206, a force is applied radially outward on at least one ring segment of the sealing ring assembly. At 1212, spring elements are maintained in a deflected state (i.e., in bending deflection). At 1214, contact between at least one spring element and at least one ring segment is maintained. At 1208, a cycle having a compression process, an expansion process and a breathing process is achieved. At 1216, contact between at least one spring element and at least one ring segment is maintained during the breathing process.

Figure 13:
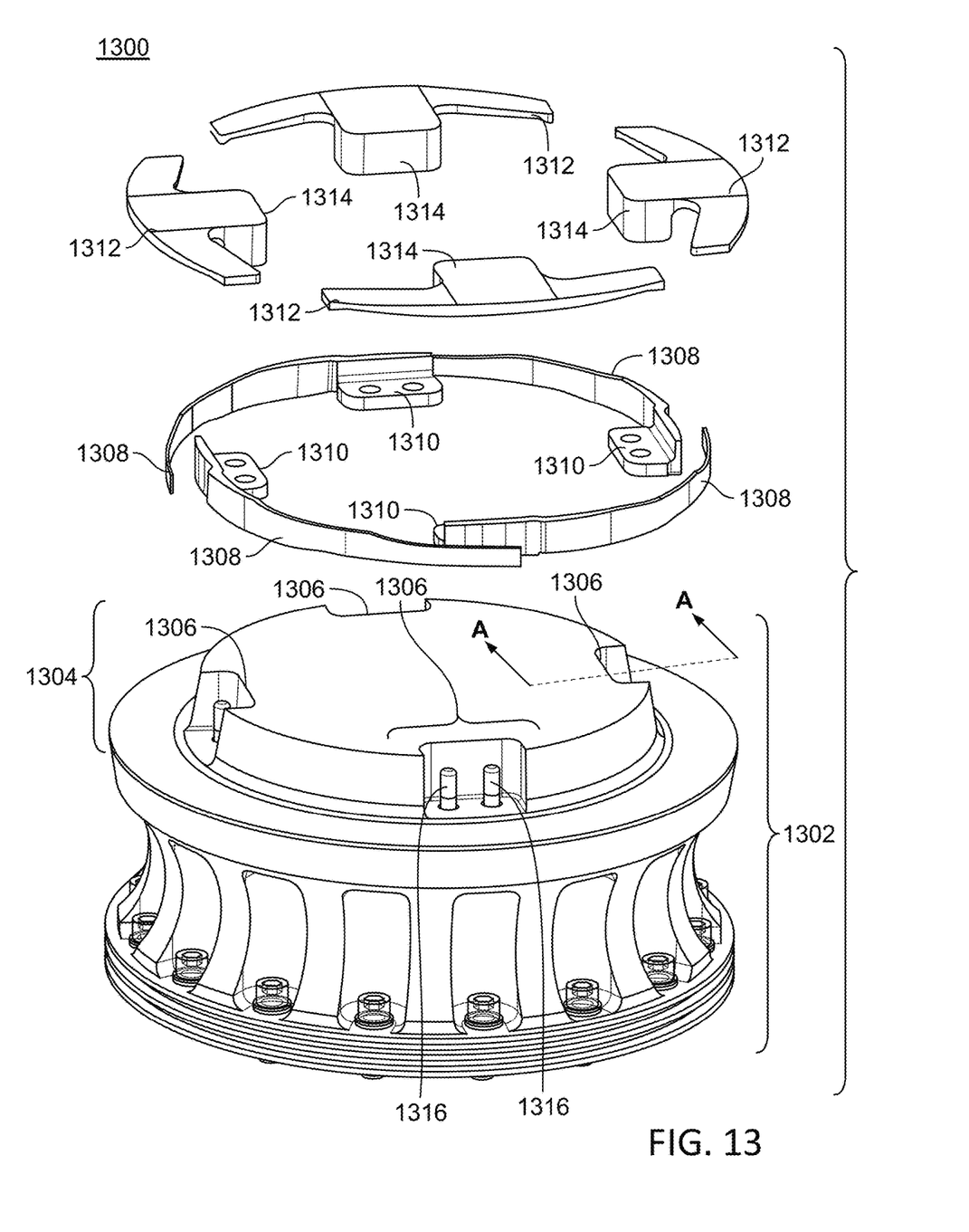
FIG. 13 shows an exploded view of a portion of a piston assembly, in accordance with some embodiments of the present disclosure.

FIG. 13 shows an exploded view of a portion of piston assembly 1300, illustrating an embodiment of a mounting arrangement of the beam springs. For clarity, the sealing ring assembly is not shown in FIGS. 13 and 14. While the embodiment shown has four beam springs, it is within the scope of this disclosure that other embodiments may have different numbers and arrangements of beam springs and sealing ring segments. For example, the piston assembly may have two or three sealing ring segments engaging two or three beam springs, respectively. In other embodiments, the piston assembly may have a single split ring with one or more beam springs acting to bias the split ring radially outward. Flanges 1310 of each of beam springs 1308 are each configured to seat into recesses 1306 on piston 1302. Each of flanges 1310 is clamped into place within recesses 1306 by one or more of retaining caps 1312. For example, one of beam springs 1308 placed over screws 1316 within one of recesses 1306 and clamped between one of retaining caps 1312 and one of recesses 1306 via one of retaining bodies 1314 of a respective retaining cap of retaining caps 1312. This stack-up may be secured by bolts, screws, rivets, welding, brazing or otherwise bonding, a shrink or interference fit, or any other suitable method. In the embodiment shown in FIG. 13, the retaining caps are secured by screws. For example, screws 1316 thread into one of retaining bodies 1314 of retaining caps 1312 to clamp one of beam springs 1308. In some embodiments, the beam spring may be integral to the piston such that it is manufactured as part of the piston wherein the base of the beam spring is integrated and does not require attaching to the piston.

Figure 14:
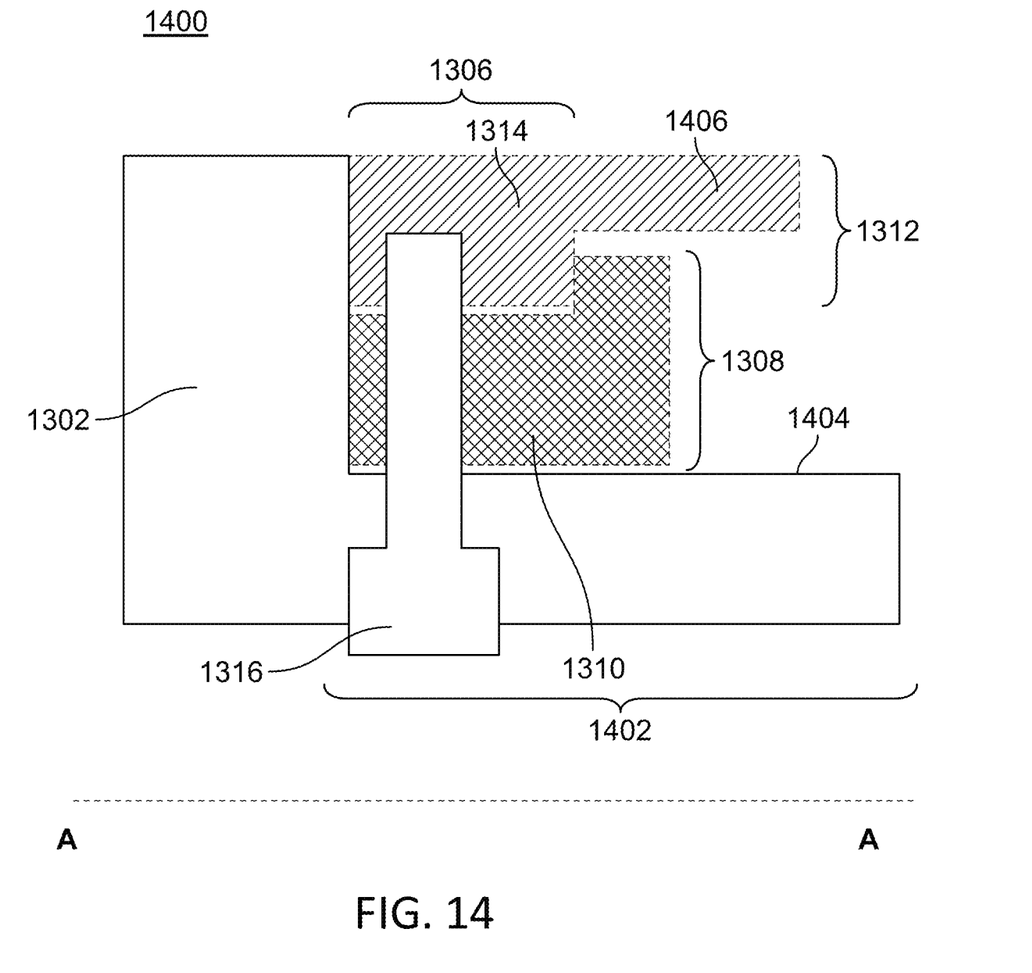
FIG. 14 shows section A-A, which provides a detailed view of a beam spring attachment configuration according to the embodiment of FIG. 13, in accordance with some embodiments of the disclosure.

Section A-A in FIG. 14 provides a view of an exemplary beam spring attachment configuration according to the embodiment in FIG. 13. Flange 1310 of beam spring 1308 is arranged in recess 1306 of ring groove 1402 on piston 1302. Retaining body 1314 of retaining cap 1312 is also located in recess 1306 on top of flange 1310 of beam spring 1308. Flange 1310 is clamped by screw 1316 (a second screw is included as shown in FIG. 13, but not shown in FIG. 14 considering what is visible via cross section A-A). Screw 1316 extends through a land or surface of piston 1302 in order to protrude into ring groove 1402. Screw 1316 also extends through flange 1310 and is received by a threaded portion of retaining body 1314 in order to generate a clamping force between retaining cap 1413 and a surface of piston 1302 that is part of ring groove 1402. In some embodiments, screw 1316 may have a clearance fit through flange 1310. In other embodiments, screw 1316 may have a line to line fit within an opening in flange 1310. Screw 1316 may be tight enough to enable a gas-tight seal between retaining cap 1312, beam spring 1308, and piston 1302 within ring groove 1402 so that pressurized gas does not have a pathway from the front of piston 1302 to piston land 1404, which is axially removed from a sealing ring assembly comprised of beam spring 1308 within ring groove 1402. A bending moment results from a load being applied to an end portion of beam spring 1308. The bending moment occurs at flange 1310 and may be resisted by screw 1316, retaining body 1314 as result of friction, one or more walls of recess 1306, a retaining ring not shown in FIG. 14, or combinations thereof. Ring groove 1402 is formed between piston land 1404 and retaining cap 1312 such that the ring assembly (not shown) fits radially outboard of beam spring 1308 in ring groove 1402. Retaining cap 1312 may have at least one of wing 1406 extending radially along a surface of ring groove 1402 and parallel to piston land 1404 to provide an upper bound to ring groove 1402 (e.g., an upper land of ring groove 1402).

It will be understood that the present disclosure is not limited to the embodiments described herein and can be implemented in the context of any suitable system. In some suitable embodiments, the present disclosure is applicable to reciprocating engines and compressors. In some embodiments, the present disclosure is applicable to free-piston linear generators and compressors. In some embodiments, the present disclosure is applicable to combustion and reaction devices such as a reciprocating engine and a free-piston engine. In some embodiments, the present disclosure is applicable to non-combustion and non-reaction devices such as reciprocating compressors and free-piston compressors. In some embodiments, the present disclosure is applicable to linear reciprocating devices with driver section (e.g., gas springs). In some embodiments, the present disclosure is applicable to oil-free reciprocating and free-piston generators and compressors. In some embodiments, the present disclosure is applicable to oil-free free-piston engines with internal or external combustion or reactions. In some embodiments, the present disclosure is applicable to oil-free free-piston generators that operate with compression ignition (e.g., homogeneous charge compression ignition (HCCI), stratified charge compression ignition (SCCI), or other compression ignition), spark ignition, or both. In some embodiments, the present disclosure is applicable to oil-free free-piston generators that operate with gaseous fuels, liquid fuels, or both. In some embodiments, the present disclosure is applicable to engines that can be combustion engines with internal combustion/reaction or any type of heat engine with external heat addition (e.g., from a heat source or external reaction such as combustion).

The foregoing is merely illustrative of the principles of this disclosure and various modifications may be made by those skilled in the art without departing from the scope of this disclosure. The above described embodiments are presented for purposes of illustration and not of limitation. The present disclosure also can take many forms other than those explicitly described herein. Accordingly, it is emphasized that this disclosure is not limited to the explicitly disclosed methods, systems, and apparatuses, but is intended to include variations to and modifications thereof, which are within the spirit of the following claims.

What is claimed is:

1. A piston assembly comprising:
a piston comprising a land;
a wedge-shaped ring segment arranged against the land, wherein the ring segment comprises:
a radially inner surface,
a radially outer surface for sealing against a bore, and
a boss located on the radially inner surface; and
a beam spring having a proximal end attached to the piston and a distal end in direct contact with the boss, wherein the beam spring forces at least a portion of the ring segment radially outward by applying a force on the boss.

2. The piston assembly of claim 1, wherein the wedge-shaped ring segment is a first ring segment and the beam spring is a first beam spring and the boss is a first boss:
the piston assembly further comprising:
a second ring segment opposing the first ring segment;
a second boss located on an inner radial surface of the second ring segment;
a second beam spring having a proximal end attached to the piston and a distal end in contact with the second boss, wherein the second beam spring forces at least a portion of the second ring segment radially outward.

3. The piston assembly of claim 1, wherein the piston is an open-faced piston comprising a gas path to the radially inner surface from a face of the piston.

4. The piston assembly of claim 1, wherein the wedge-shaped ring segment comprises at least one gap cover element for sealing against another ring segment of a sealing ring assembly comprised of the wedge-shaped ring segment and against the bore.

5. The piston assembly of claim 1, wherein the piston comprises a ring groove, wherein the land forms a surface of the ring groove, and wherein the ring segment is arranged in the ring groove.

6. The piston assembly of claim 5, wherein the ring groove comprises at least one recess for accommodating a mounting feature of the beam spring.

7. The piston assembly of claim 1, further comprising a front land comprising one or more retaining caps.

8. The piston assembly of claim 7, wherein the proximal end of the beam spring is attached to the piston by the one or more retaining caps, wherein the one or more retaining caps retain the beam spring against the piston.

9. The piston assembly of claim 1, wherein
the beam spring comprises a flange configured to fixedly attach the beam spring to the piston.

10. A sealing ring assembly comprising:
at least one ring segment configured to seal against a bore of a cylinder and a piston; and
a plurality of spring elements that overlap azimuthally and arranged radially inward of the at least one segment and configured to apply a force radially outward on the at the least one ring segment, wherein the plurality of spring elements are to extend 180 degrees or less azimuthally around the piston.

11. The sealing ring assembly of claim 10, wherein the at least one spring element comprises:
a mounting section that is configured to be affixed to a piston; and
a spring section having an undeflected state when unloaded, wherein the spring section is unloaded when the at least one spring element is installed radially inward of the at least one ring segment in a ring groove of the piston while a linear generator comprising the piston is not in operation, and wherein the spring section is configured to achieve a deflected state during operation of the linear generator.

12. The sealing ring assembly of claim 11, wherein the spring section extends azimuthally along at least one of about 30 degrees, 45 degrees, 60 degrees, 90 degrees, 120 degrees, 180 degrees, or 360 degrees.

13. The sealing ring assembly of claim 10, wherein the at least one ring segment comprises N ring segments, wherein the plurality of spring elements comprises N spring elements, and wherein N is a positive integer greater than one.

14. The sealing ring assembly of claim 10, wherein the at least one ring segment comprises a solid lubricating material, and wherein the sealing ring assembly is for operation without liquid lubricant or oil.

15. A method of operating a linear generator, the method comprising:
controlling a trajectory of a translator comprising a piston;
forming a seal between a bore of a cylinder and the piston using a sealing ring assembly for operating without oil or liquid lubricant; and
applying a force radially outward on at the least one ring segment of the sealing ring assembly using at least one spring element arranged radially inward of the at least one ring segment, wherein:
the at least one spring element is configured to extend 180 degrees or less azimuthally around the piston,
the at least one spring element comprises a plurality of spring elements, and
the plurality of spring elements overlap azimuthally.

16. The method of claim 15, further comprising causing the sealing ring assembly to wear against the bore during operation.

17. The method of claim 15, wherein applying a force radially outward on at the least one ring segment of the sealing ring assembly comprises:
maintaining the at least one spring element in bending deflection during operation; and
maintaining contact between the at least one spring element and the at least one ring segment.

18. The method of claim 15, wherein:
the translator is a first translator,
the piston is a first piston,
the linear generator further comprises a second translator comprising a second piston,
forming the seal between the bore of the cylinder and one or more of the first piston or the second piston forms a high pressure region and a low pressure region, and
a pressure difference between the high pressure region and the low pressure region changes with the trajectory of the first translator and the second translator.

19. The method of claim 15, further comprising:
achieving a cycle comprising a compression process, an expansion process, and a breathing process that occurs between the expansion process and the compression process; and
maintaining contact between the at least one spring element and the at least one ring segment at least during the breathing process.

20. A sealing ring assembly comprising:
at least one wedge-shaped ring segment to seal against a bore of a cylinder and a piston;
a boss on a radially inner surface of the ring segment; and
at least one spring element arranged radially inward of the at least one ring segment to apply a force radially outward on the boss, wherein the at least one spring element is configured to extend 180 degrees or less azimuthally around the piston.

* * * * *